July 10, 1934.　　　　　R. F. NELSON　　　　　1,965,719
METHOD AND MACHINE FOR MAKING LAMINATED PAPER
Filed April 8, 1932
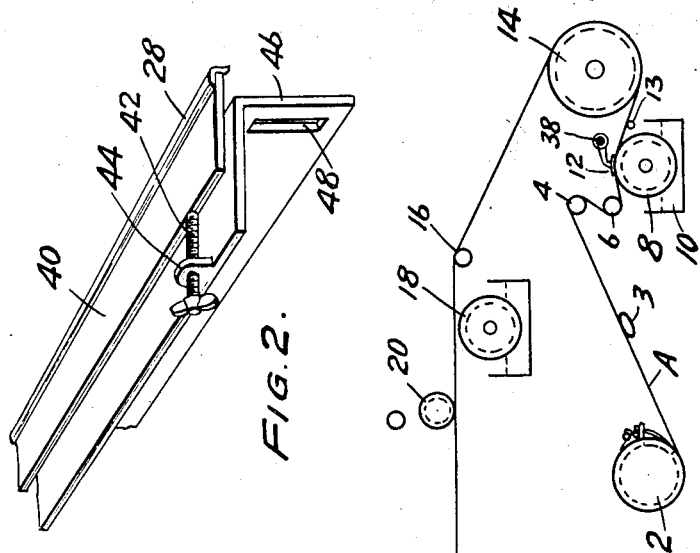
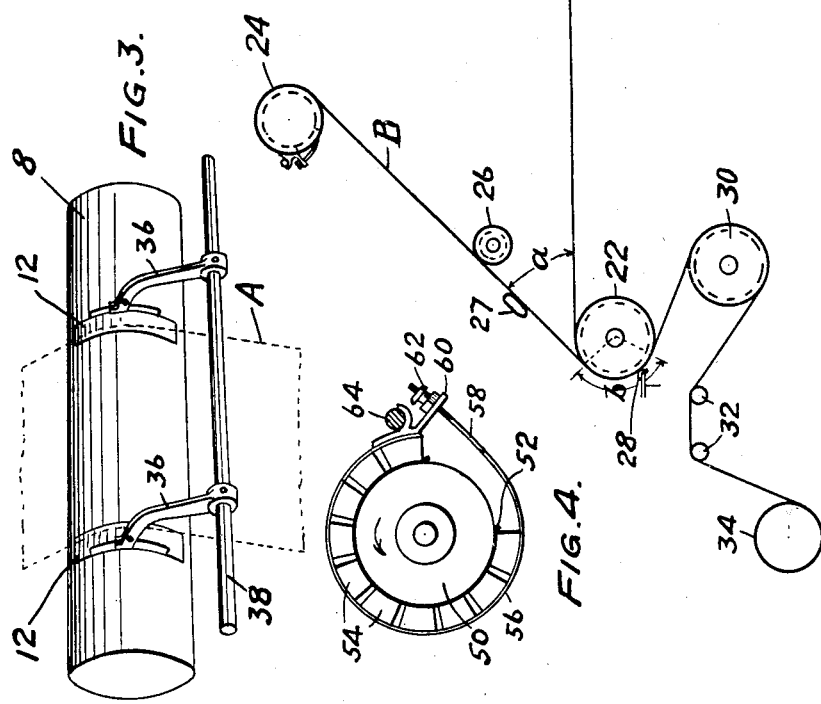
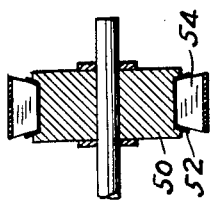
INVENTOR
Robert F. Nelson
BY
ATTORNEYS Patented July 10, 1934

1,965,719

UNITED STATES PATENT OFFICE 1,965,719

METHOD AND MACHINE FOR MAKING LAMINATED PAPER

Robert F. Nelson, Ardmore, Pa., assignor to The Glassine Paper Company, West Conshohocken, Pa., a corporation of Delaware Application April 8, 1932, Serial No. 603,914

20 Claims. (Cl. 154—40)

This invention relates to a method and machine for making laminated paper, particularly paper of the character described in the application of Chester E. Beecher, Serial No. 414,864, filed December 18, 1929, Patent No. 1,936,375, Nov. 21, 1933.

The laminated paper described in this Beecher application is transparent and at the same time is moistureproof to a high degree while the objections to ordinary waxed transparent paper are obviated. Briefly stated, the paper referred to consists of two sheets secured together by paraffine wax, or perhaps, more properly the vacuum produced by the use of a very thin film of wax. The sheets are formed by sheeting pure sulphite pulp, preferably of spruce, wetting the sheeted product and ironing out the wetted sheet by the application of heat and pressure, this paper being known as "glassine" paper and being substantially grease-proof and also substantially non-absorbent of wax. It is of fine texture and transparent and may be printed upon in the same fashion as ordinary paper. In the final laminated product while the paraffine adheres the two sheets of transparent paper together and retains the effective transparency thereof, there is no paraffine on the outer faces of the laminated material and, accordingly, it may be printed upon using ordinary inks. The transparency of this laminated paper is as great as ordinarily obtained by impregnating ordinary paper with wax.

The intermediate film of wax renders the laminated material moistureproof and waterproof even though the moisture may penetrate the outer sheets. On the other hand, the material is grease-proof because the outer sheets are of greaseproof paper formed in the manner described. The outer sheets also prevent contact between the contents of a package made of the material with the wax so as to avoid the imparting of the taste of wax thereto as commonly occurs with the use of ordinary wax paper.

It is the object of the present invention to provide a method and machine for the production of the laminated material just described which will insure obtaining a product of high quality, that is, having perfect uniformity and a high degree of transparency. To obtain a product of the highest quality it is not sufficient merely to apply melted wax to sheets of glassine paper and superimpose one on the other, but it is necessary to carry out the process under conditions of temperature, tension, etc., which are established and maintained with great care. Specific objects of the present invention relate particularly to such details which are found desirable in any case and necessary where a perfect product is to be produced.

Specific objects of the invention relating particularly to the mechanical details will be apparent from the following description read in conjunction with the accompanying drawing in which:

Fig. 1 is a diagrammatic elevation of a mechanism designed to carry out a preferred form of the process;

Fig. 2 is a perspective fragmentary view of a pressing element used in the mechanism;

Fig. 3 is a perspective view showing the means for applying wax to the paper;

Fig. 4 is a side elevation of a brake arrangement for maintaining a proper tension upon the sheets; and Fig. 5 is an axial section through the same.

At 2 there is indicated a supply roll of water calendered sulphite spruce pulp paper of the character described above and more fully discussed in the Beecher application Serial No. 414,864. The paper passes from this supply roll, the journal of which carries a suitable drum against which bears a brake to properly tension the sheet, over a spreader bar 3 which bears lightly against the sheet and serves to smooth out any irregularities therein. Preferably, the web of paper A passes from the bottom of the supply roll 2 as illustrated, although, if desired, it may pass from the top thereof. The spreader bar may be on either side of the paper.

From the spreader bar 3 the paper passes over idler rolls 4 and 6 which are vertically adjustable in the frame so as to afford a fine adjustment of tension on the paper and also to insure a condition of even running. The idler roll 6 depresses the web of paper so that it has a limited arcuate contact with a steam heated waxing roll 8 which extends below the surface of the melted wax in a receptacle 10. The roll 8 is driven to rotate with the movement of the sheet so as to carry wax to the lower surface of the sheet. To keep the extreme edges of the sheet free from the coating material there are provided scrapers 12 to underly the extreme edges of the web and thus prevent them from receiving a wax incrustation. Preferably, about one-quarter inch of each edge of the paper overlies a scraper as it is found that this prevents hard ridges on the final laminated sheet.

After passing from the waxing roller 8 the sheet passes over a scraper in the form of a rotating rod which is geared to the driving mechanism for the waxing roll so as to rotate in the same direction as this roll. The scraper not only serves to remove excess wax but also serves to spread the wax which is on the lower surface of the sheet more evenly. By suitable adjustment of the scrapers 12 and the other parts, the excess wax on the sheet will be just sufficient when spread out by the scraper to properly coat the sheet from edge to edge uniformly.

Preferably, paraffine wax is used to coat the sheet. This paraffine wax may have a melting point ranging from 116° F. to 135° F., but preferably refined paraffine having a melting point between 118° F. to 120° F. is used. The amount of paraffine wax thus applied may range from two and one-half to four pounds of paraffine per ream spread uniformly over the sheet by the means just described, but apparently three pounds per ream is best. The temperature of the paraffine in a container is preferably substantially above its melting point, being from 120° F. to 160° F. A temperature of 145° F. is most satisfactory. The temperature of the waxing roll which may serve not only as a coating agent for the wax but as the source of heat for the bath may range from 125° F. to 180° F., preferably being at such temperature as to maintain a temperature of approximately 145° F. in the bath.

From the scraper the web passes about a water or steam heated roller 14 contacting with this roller on its uncoated side. The temperature of roller 14 may be from 100° F. to 120° F. but is best at 110° F. From the roller 14 the web passes over a fly roll 16 which is vertically adjustable in the frame and in the present instance causes the web to skip the top coating roll 18 usually provided on this general type of machine but not used in the present process. From the fly roll 16 the web passes beneath a steam heated roll 20 which is maintained at a temperature between 100° F. to 160° F. in order to keep the coating even in event of a slow running speed or on account of considerable distance to the point of lamination. The temperature of this roll is so adjusted so that by contact with the wax on the web it raises the wax to such temperature that, allowing for loss of heat during its progress to the point of lamination, it will at the latter point have the proper temperature for association with the other web.

The web A heretofore described next passes over the steam heated roller 22 by which lamination is effected.

A supply roll 24 of material of the same type as A supplies the web B for association with web A. The web B passes over a steam heated roll 26 to bring it to the same temperature as the web A at the point of lamination. This roller which is similar to 20 may be above or underneath the web. Its presence is very important inasmuch as if the two webs where they meet are at different temperatures there will occur uneven shrinkage due to the contact of the cold and warm papers. After leaving the roller 26 the web B contacts with a spreader bar 27 similar to spreader bar 3.

The two webs A and B tangentially approach the roll in the general manner illustrated forming in their approach an angle preferably ranging between 25° and 40° and preferably about 33°. This means, of course, that the points where the sheets have tangent contact with the roll 22 are angularly spaced by this same angle. This angle is designated $a$ in Fig. 1. The sheets after contacting with each other remain in contact with the roller 22 through an arc which is preferably greater than about 60° and is in one preferred installation approximately 110°. This angle is designated $b$ in Fig. 1. Pressing the sheets together against the roller along a transverse line located at a place at which the sheets have had substantial contact with each other of preferably more than 50° is a presser 28, the details of construction of which are illustrated in Fig. 2. This presser forces the two associated webs tightly together to provide an absolute union of the two greaseproof and air impervious sheets by forcing out all air between the two layers with the result that the practical vacuum thereby obtained, even more than the paraffine, keeps the sheet in its laminated state. The location of the presser at the point described as preferably more than 50° following initial contact between the sheets is very important. If means of this sort is not used, there is likely to be either an excess of wax between the sheets or bubbles of air. In the former case the excess of wax not only reduces the transparency of the product but also more readily permits relative movements of the two sheets. If bubbles are permitted between the sheets of the final product conditions are produced which obviously affect the quality of the sheet both with respect to transparency and adherence of the layers. The roller 8 is maintained at a temperature preferably between 140° F. and 160° F., the preferable temperature being 145° F. This insures with wax having a melting point such as indicated above a proper fluidity for the operation of assembly.

The now laminated web continues after leaving the roll 22 about the roll 30 which is maintained by steam or water heating at a temperature between 100° F. and 120° F. Thence it passes over draw rolls 32 into the winding reel 34.

In a satisfactory installation it is found that the rolls 4, 6, 16 and 32 preferably have a diameter of 2½ inches. The waxing roll 8 has a diameter of 10 inches, roller 14 a diameter of 16 inches, rollers 20 and 26 diameters of 6 inches and rollers 22 and 30 diameters of 13 inches. The widths of these rollers is of course suitable to accommodate a sheet of any desired width. Sheets having widths of 60 inches may be readily laminated by this process.

To obtain perfect unions of the two webs, an absolutely even tension must be obtained on the two sheets during the laminating process. This tension is obtained by applying brakes to the supply reels 2 and 24. As illustrated in Figs. 4 and 5 each of the shafts of these supply reels is provided with a brake drum 50 with which contacts an arcuate strip of felt secured to the inner surfaces of the wooden blocks 54. A band 56 to which the wooden blocks are secured may be drawn taut by the cooperation of the elements most clearly disclosed in Fig. 4 consisting of a threaded extension 58 on which a nut 62 is adjustable against a bracket 60 carried by the other end of the strip 56. A fixed rod 64 prevents rotation of the brake with the drum. By the use of the felt 52 a very fine adjustment of the tension may be secured. By relative adjustments of the brakes associated with the two supply reels the tensions at the point where the two webs come into contact may be adjusted so as to be exactly correct for proper lamination. The frictions, if desired, particularly where very fine adjustment is to be secured, may be run in oil.

As illustrated in Fig. 3 the scrapers 12 are carried by arms 36 which are adjustable along and around a fixed transverse rod 38 to which they are secured in adjusted position by suitable set screws.

In Fig. 2 there is illustrated one end of the presser arrangement cooperating with the roller 22. A felt strip 28 which presses against the webs is carried by the transverse edge of a board 40 which is adjustable inwardly and outwardly by means of screws 42 journalled on the board and threaded through upstanding ears 44 carried by a bracket 46 which is secured to the frame being vertically adjustable on the frame by reason of the provision of vertical slots 48 through which pass fixed studs carrying nuts, which clamp bracket 46 rigidly to the frame.

To further insure absolute uniformity of tension and draw around the roller 22, adhesively coated paper tape is sometimes run around this roll at required points where the sheet might be slack due to slight variation in caliper or formation. Similar taping may be done on the roller 14 for the same reasons.

By the careful maintenance of the temperatures and conditions as above indicated, it is found that a perfectly laminated sheet is obtainable having the characteristics outlined above and having particularly a high degree of transparency and uniformity of appearance.

It will be obvious that numerous variations in details may be made without departing from the spirit of the invention as defined in the following claims; that is, in case other waxes are used than that indicated the temperatures of operation may be correspondingly changed. Further, of course, the general arrangement of the parts of the mechanism used may be different from that specifically described above.

What I claim and desire to protect by Letters Patent is:

1. The method of making a grease and moisture proof laminated sheet material which includes applying to one surface of a sheet of greaseproof paper, which is non-absorbent of wax, a coating of melted wax at a temperature substantially in the range 120° F. to 160° F., and applying a second similar sheet of paper to the waxed surface of the first sheet by the application of pressure.

2. The method of making a grease and moisture proof laminated sheet material which includes applying to one surface of a sheet of greaseproof paper, which is non-absorbent of wax, a coating of melted wax at a temperature of approximately 145° F., and applying a second similar sheet of paper to the waxed surface of the first sheet by removal of air from between the sheets and the application of pressure.

3. The method of making a grease and moisture proof laminated sheet material which includes applying to one surface of a sheet of greaseproof paper, which is non-absorbent of wax, a coating of melted wax at a temperature substantially in the range 120° F. to 160° F., and applying a second similar sheet of paper to the waxed surface of the first sheet by the application of pressure, the temperature of the sheets at the point of contact being within the range 140° F. to 160° F.

4. The method of making a grease and moisture proof laminated sheet material which includes applying to one surface of a sheet of greaseproof paper, which is non-absorbent of wax, a coating of melted wax at a temperature of approximately 145° F., and applying a second similar sheet of paper to the waxed surface of the first sheet by the application of pressure, the temperature of the sheets at the point of contact being within the range 140° F. to 160° F.

5. The method of making a grease and moisture proof laminated sheet material which includes applying to one surface of a sheet of greaseproof paper, which is non-absorbent of wax, a coating of melted wax at a temperature substantially in the range 120° F. to 160° F., and applying a second preheated similar sheet of paper to the waxed surface of the first sheet by the application of pressure.

6. The method of making a grease and moisture proof laminated sheet material which includes applying to one surface of a sheet of greaseproof paper, which is non-absorbent of wax, a coating of melted wax at a temperature substantially in the range 120° F. to 160° F., and applying a second similar sheet of paper to the waxed surface of the first sheet by the application of pressure, said sheets being approximately at the same temperature immediately prior to contact with each other.

7. The method of making a grease and moisture proof laminated sheet material which includes applying to one surface of a sheet of greaseproof paper, which is non-absorbent of wax, a coating of melted wax at a temperature of approximately 145° F., and applying a second similar sheet of paper to the waxed surface of the first sheet by the application of pressure, said sheets being approximately at the same temperature immediately prior to contact with each other.

8. The method of making a grease and moisture proof laminated sheet material which includes applying to one surface of a sheet of greaseproof paper, which is non-absorbent of wax, a coating of melted wax, and applying a second similar sheet of paper to the waxed surface of the first sheet by the application of pressure, the second sheet being preheated so that said sheets are approximately at the same temperature immediately prior to contact with each other.

9. The method of making a grease and moisture proof laminated sheet material which includes applying to one surface of a sheet of greaseproof paper, which is non-absorbent of wax, a coating of melted wax, and applying a second similar sheet of paper to the waxed surface of the first sheet by the application of pressure at a temperature substantially in the range 140° F. to 160° F.

10. The method of making a grease and moisture proof laminated sheet material which includes passing two greaseproof paper sheets, which are non-absorbent of wax, about a roller, one of the sheets carrying a coating of melted wax on its surface to be contacted with the other sheet, and pressing the sheets together against the roller along a transverse line located at a place at which the sheets have had substantial contact.

11. The method of making a grease and moisture proof laminated sheet material which includes passing two greaseproof paper sheets, which are non-absorbent of wax, about a roller, one of the sheets carrying a coating of melted wax on its surface to be contacted with the other sheet, and pressing the sheets together against the roller along a transverse line located at a place at which the sheets have had substantial contact through an arc of more than 50°.

12. The method of making a grease and moisture proof laminated sheet material which includes passing a sheet of greaseproof paper which is non-absorbent of wax over a waxing roll while preventing transfer of wax to the edges of the sheet, spreading the molten wax to remove excess by passing the sheet in contact with a scraper, passing said sheet over a heated pressure roller, feeding a second preheated sheet to said pressure roller at an angle of approach different from that of the first sheet to contact with the waxed surface of the first sheet, and pressing said sheets together against the pressure roller along a transverse line located at a place at which the sheets have had substantial contact.

13. The method of making a grease and moisture proof laminated sheet material which includes passing a sheet of greaseproof paper which is non-absorbent of wax over a waxing roll while preventing transfer of wax to the edges of the sheet, spreading the molten wax to remove excess by passing the sheet in contact with a scraper, passing said sheet over a heated pressure roller, feeding a second preheated sheet to said pressure roller at an angle of approach different from that of the first sheet to contact with the waxed surface of the first sheet, and pressing said sheets together against the pressure roller along a transverse line located at a place at which the sheets have had substantial contact, said sheets being tensioned at the supplies thereof.

14. The method of making a grease and moisture proof laminated sheet material which includes passing a sheet of greaseproof paper which is non-absorbent of wax over a waxing roll, passing said sheet over a heated pressure roller, and feeding a second preheated sheet to said pressure roller at an angle of approach different from that of the first sheet to contact with the waxed surface of the first sheet, said sheets being tensioned at the supplies thereof.

15. A machine for the manufacture of laminated sheet material including a heated pressure roller, means for applying molten wax to one surface of a sheet of paper and for guiding the sheet to said pressure roller, means for guiding a second sheet to said pressure roller at an angle of approach different from that of the first sheet, and means for pressing said sheets together against the pressure roller along a transverse line located at a place at which the sheets have had substantial contact.

16. The method of making a grease and moisture proof laminated sheet material which includes passing a sheet of greaseproof paper which is non-absorbent of wax over a waxing roll, passing said sheet over a heated pressure roller, and feeding a second preheated sheet to said pressure roller at an angle of approach different from that of the first sheet to contact with the waxed surface of the first sheet, said sheets being tensioned at the supplies thereof, and pressing the sheets together against the pressure roller by means of a transverse strip of yielding material.

17. A machine for the manufacture of laminated sheet material including a heated pressure roller, means for applying molten wax to the surface of a sheet of paper and for guiding the same to the pressure roller from a supply, means for guiding a second sheet of paper to the pressure roller from a supply, means for pressing the sheets against said pressure roller, and means for tensioning the sheets at their respective supplies.

18. A machine for the manufacture of laminated sheet material including a waxing roll, a pressure roller, means for guiding the sheet over the waxing roll and to the pressure roller, means for feeding a second sheet to said pressure roller, and means for pressing said sheets together against the pressure roller along a transverse line located at a place at which the sheets have had substantial contact.

19. A machine for the manufacture of laminated sheet material including a waxing roll, a pressure roller, means for guiding the sheet over the waxing roll and to the pressure roller, means for feeding a second sheet to said pressure roller, means for pressing said sheets together against the pressure roller along a transverse line located at a place at which the sheets have had substantial contact, and means for bringing said sheets to approximately the same temperature before they engage each other at the pressure roller.

20. A machine for the manufacture of laminated sheet material including a heated pressure roller, means for applying wax to one surface of a sheet of paper and for guiding the sheet to said pressure roller, means for guiding a second sheet to said pressure roller at an angle of approach different from that of the first sheet, and means for pressing said sheets together against the pressure roller along a transverse line located at a place at which the sheets have had substantial contact, said last named means comprising a transverse strip of yielding material.

ROBERT F. NELSON.